United States Patent [19]

Stoican

[11] Patent Number: 5,152,128
[45] Date of Patent: Oct. 6, 1992

[54] LAWNMOWER BAG APPARATUS

[76] Inventor: George A. Stoican, 44 Eider Bay, Thompson, Manitoba, R8N 0Z9, Canada

[21] Appl. No.: 733,120

[22] Filed: Jul. 19, 1991

[51] Int. Cl.⁵ .............................................. A01D 34/70
[52] U.S. Cl. ............................................ 56/202; 56/203
[58] Field of Search ............... 56/202, 196, 197, 199, 56/201, 203, 204, 205, 206

[56] References Cited

U.S. PATENT DOCUMENTS

| | | | |
|---|---|---|---|
| 3,108,420 | 10/1963 | Gercke | 56/205 |
| 4,637,203 | 1/1987 | Fedeli | 56/202 |
| 5,076,045 | 12/1991 | McClung, IV | 56/202 |

Primary Examiner—Terry Lee Melius
Attorney, Agent, or Firm—Leon Gilden

[57] ABSTRACT

A lawnmower bag includes a flexible bag, with a top framework. The top framework includes a forwardly extending handle defined by a loop directed forwardly of the framework, with side rails of the framework slidably mounting a pusher plate therealong to effect removal of grass collected within the bag structure. The pusher plate includes a threadedly removable rod mounted thereto for selective securement of the rod relative to the pusher plate. A modification of the invention includes a pusher plate formed of a hinged plate construction biased rearwardly in a first position, with a cable effectively tensioned to permit projection of the pusher plate forwardly over grass accumulated within the bag structure to permit compaction of such grass and thereby permit enhanced efficiency of storage of grass within the bag structure.

3 Claims, 5 Drawing Sheets

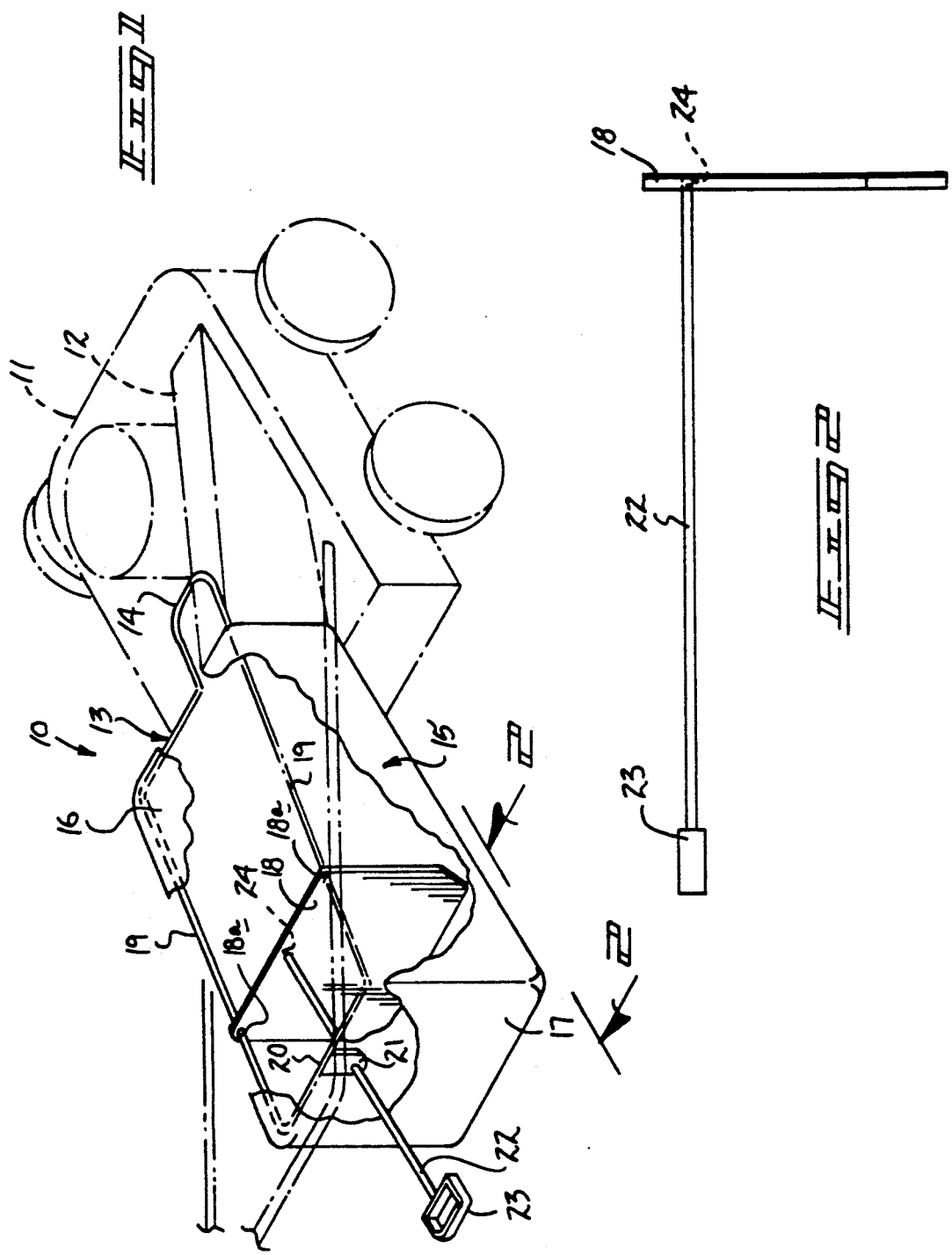

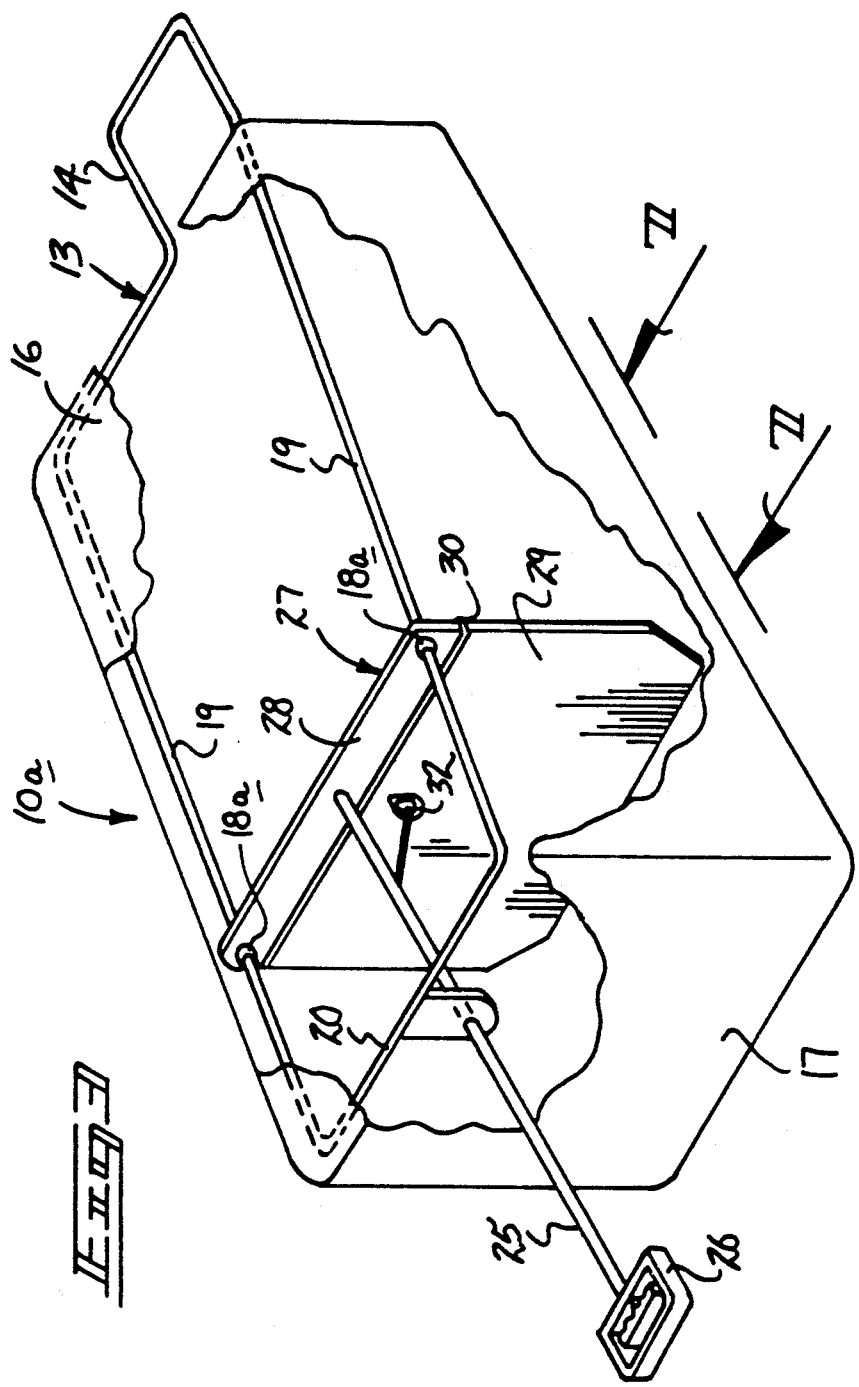

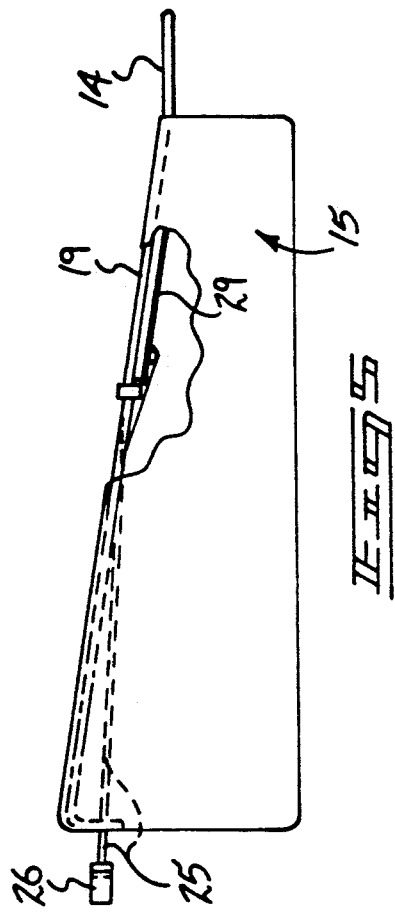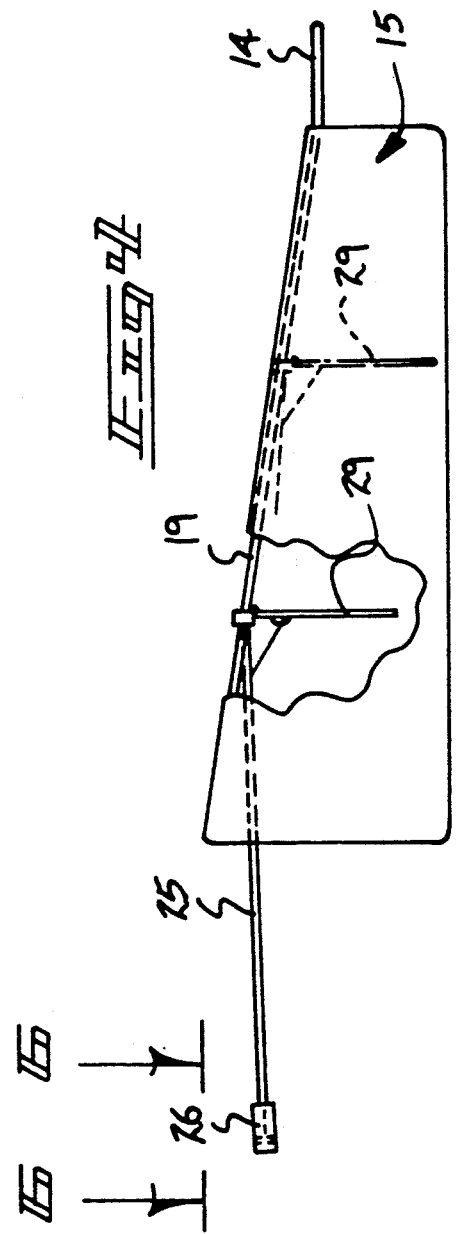

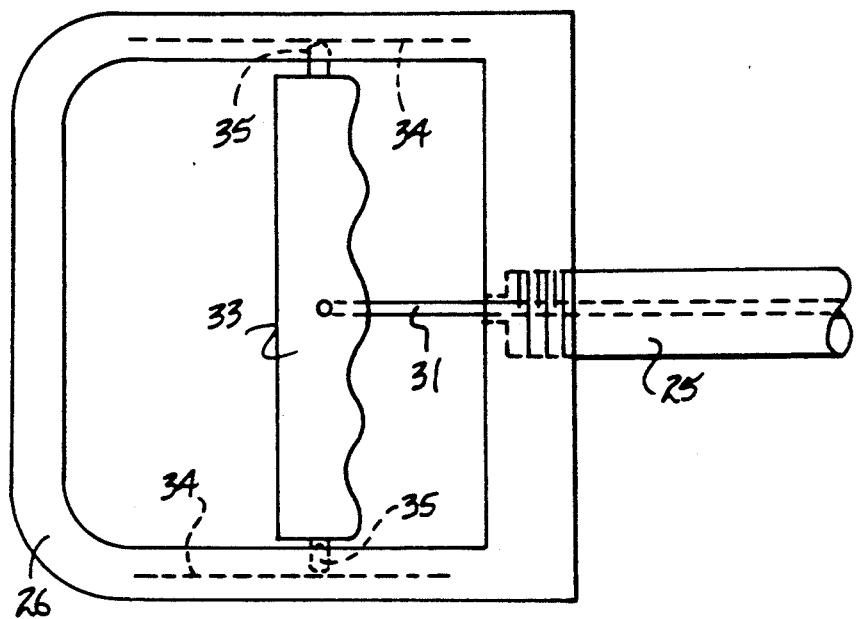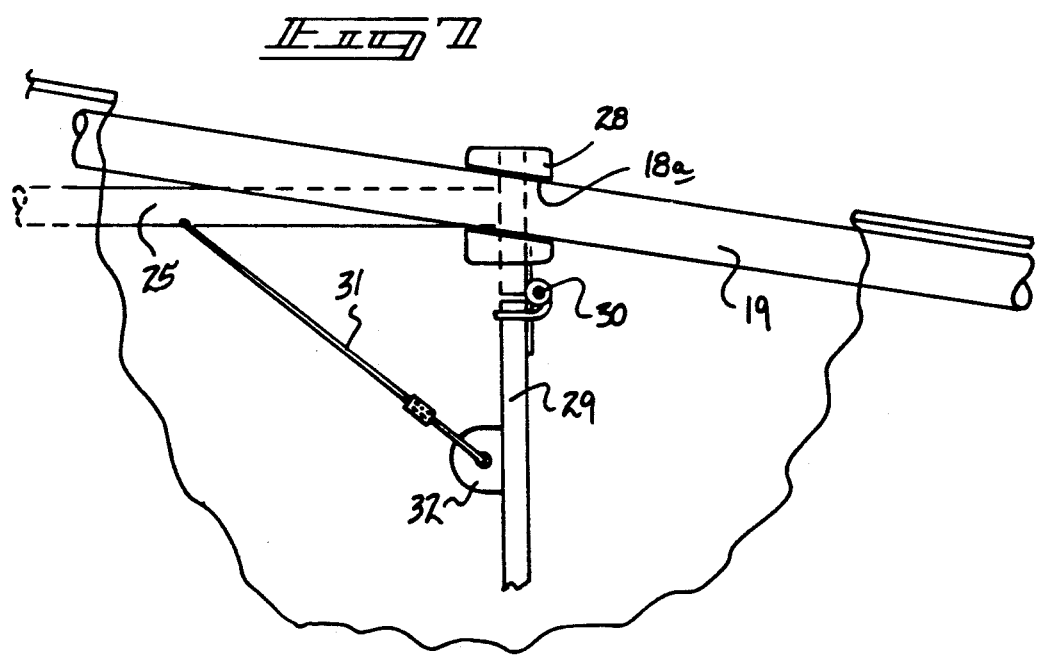

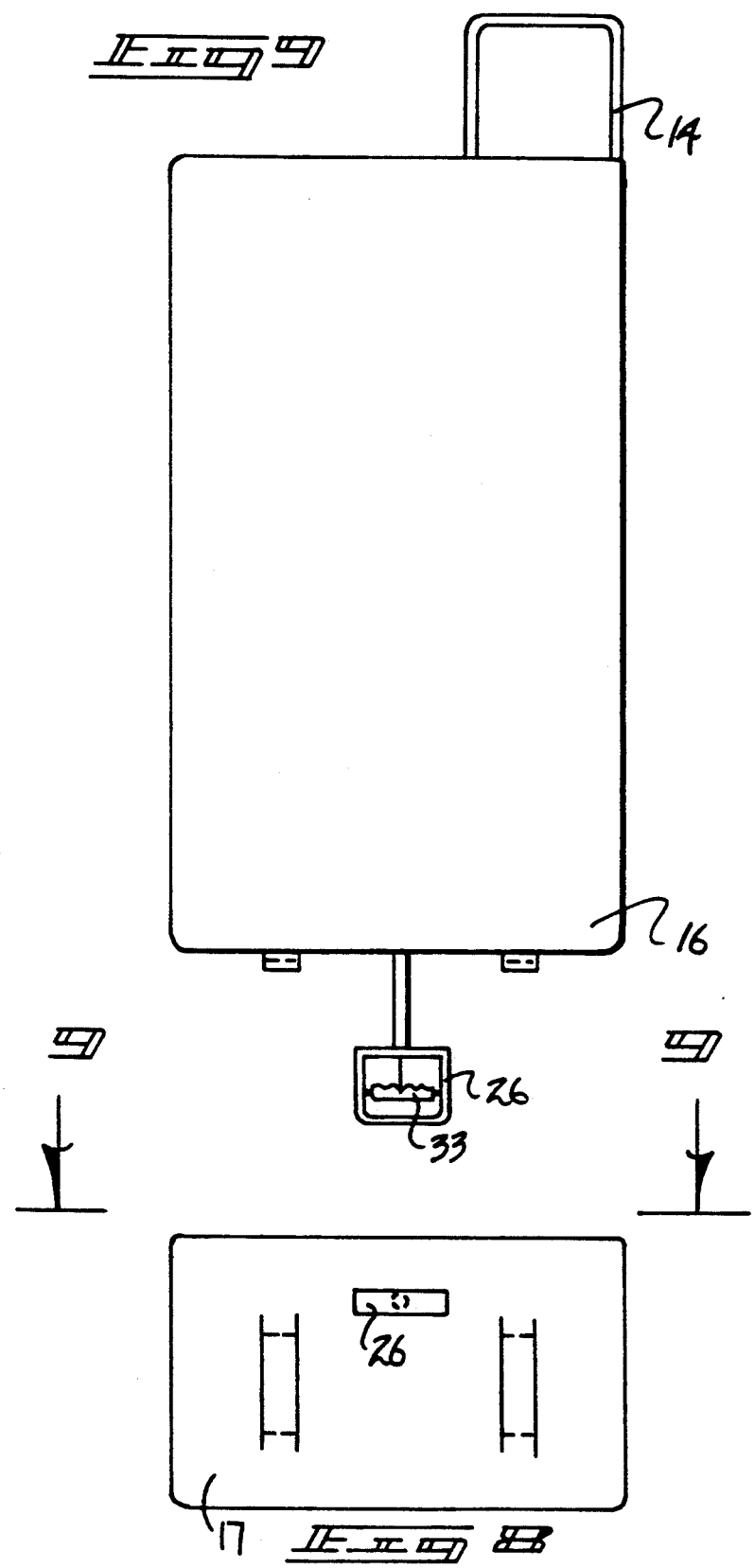

1

LAWNMOWER BAG APPARATUS

BACKGROUND OF THE INVENTION

1. Field of the Invention

The field of invention relates to lawnmower bag apparatus, and more particularly pertains to a new and improved lawnmower bag apparatus wherein the same includes plate structure mounted within the bag for selective compaction or extraction of grass relative to the bag during use.

2. Description of the Prior Art

Typically in accumulation of grass in a lawnmowing procedure, the grass is frequently difficult to remove as an entrance to the bag is of a lesser cross-sectional area than a rear portion of the bag. Alternatively, grass is accumulated within the bag structure to a lesser efficiency, wherein a further aspect of the invention provides a manner of compacting grass within the bag structure prior to its being emptied. Prior art apparatus regarding the use of grass accumulating bag structure relative to a lawn mower is illustrated in U.S. Pat. No. 4,522,019 to Edwards, et al. setting forth a bag structure with a flip-up section to permit emptying of the bag and contents therewithin.

U.S. Pat. No. 4,936,083 to Deutsch sets forth a grass catcher for lawnmowers arranged to be detachably secured to a lawnmower deck, with lateral frame members pivotally connected at inner ends to the front frame, wherein a rectilinear framework is defined for providing geometric integrity to the lawnmower bag structure.

U.S. Pat. No. 4,702,063 to Satoa sets forth a grass collecting lawnmower bag, wherein a front cover is removable to enhance its being emptied subsequent to a lawnmowing procedure.

U.S. Pat. No. 4,745,735 to Katayama sets forth a grass collecting container for use with a mower, including a dividing space inside the container body between a ventilating space and a mowed grass depositing section.

As such, it may be appreciated that there continues to be a need for a new and improved lawnmower bag apparatus as set forth by the instant invention which addresses both the problems of ease of use as well as effectiveness in construction in providing structure to the selective compaction or extraction of grass relative to an interior cavity defined by the lawnmower bag and in this respect, the present invention substantially fulfills this need.

SUMMARY OF THE INVENTION

In view of the foregoing disadvantages inherent in the known types of lawnmower bag apparatus now present in the prior art, the present invention provides a lawnmower bag apparatus wherein the same is arranged for mounting to a lawnmower chute to permit its subsequent removal therefrom and in the emptying of grass contained within the lawnmower bag. As such, the general purpose of the present invention, which will be described subsequently in greater detail, is to provide a new and improved lawnmower bag apparatus which has all the advantages of the prior art lawnmower bag apparatus and none of the disadvantages.

To attain this, the present invention provides a lawnmower bag including a flexible bag, with a top framework. The top framework includes a forwardly extending handle defined by a loop directed forwardly of the framework, with side rails of the framework slidably mounting a pusher plate therealong to effect removal of grass collected within the bag structure. The pusher plate includes a threadedly removable rod mounted thereto for selective securement of the rod relative to the pusher plate. A modification of the invention includes a pusher plate formed of a hinged plate construction biased rearwardly in a first position, with a cable effectively tensioned to permit projection of the pusher plate forwardly over grass accumulated within the bag structure to permit compaction of such grass and thereby permit enhanced efficiency of storage of grass within the bag structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawnmower bag apparatus which has all the advantages of the prior art lawnmower bag apparatus and none of the disadvantages.

It is another object of the present invention to provide a new and improved lawnmower bag apparatus which may be easily and efficiently manufactured and marketed.

It is a further object of the present invention to provide a new and improved lawnmower bag apparatus which is of a durable and reliable construction.

An even further object of the present invention is to provide a new and improved lawnmower bag apparatus which is susceptible of a low cost of manufacture with regard to both materials and labor, and which accordingly is then susceptible of low prices of sale to the consuming public, thereby making such lawnmower bag apparatus economically available to the buying public.

Still yet another object of the present invention is to provide a new and improved lawnmower bag apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic side view of the pusher plate structure utilized by the invention.

FIG. 3 is an isometric illustration of a modification of the invention.

FIG. 4 is an orthographic side view, partially in section, of the pusher plate structure in a first position.

FIG. 5 is an orthographic side view, partially in section, of the pusher plate structure of FIG. 3 in a second raised position.

FIG. 6 is an orthographic top view of the handle structure of the invention, taken along the lines 6—6 of FIG. 4 in the direction indicated by the arrows.

FIG. 7 is an orthographic view of the invention, taken along the lines 7—7 of FIG. 3 in the direction indicated by the arrows.

FIG. 8 is an orthographic end view of the bag structure of the invention.

FIG. 9 is an orthographic view, taken along the lines 9—9 of FIG. 8 in the direction indicated by the arrows.

DESCRIPTION OF THE PREFERRED EMBODIMENT

With reference now to the drawings, and in particular to FIGS. 1 to 9 thereof, a new and improved lawnmower bag apparatus embodying the principles and concepts of the present invention and generally designated by the reference numerals 10 and 10a will be described.

More specifically, the lawnmower bag apparatus 10 of the instant invention essentially comprises the apparatus mounted to an associated lawnmower 11 that includes a directing chute 12. The directing chute 12 may be oriented laterally or longitudinally of the lawnmower apparatus.

The apparatus 10 includes a top frame 13 formed of a continuous rod material to include a top frame handle loop 14 projecting forwardly of a forward frame leg, with spaced parallel side frame legs 19 and a rear frame leg 20 oriented generally parallel relative to the forward frame leg. A flexible bag 15 is mounted to and suspended from the top frame 13 and includes a flexible bag top web 16 and a rear web 17, with the bag 15 defining an enclosure receiving the directing chute 12 through a forward entrance thereof adjacent to and below the handle loop 14. A rigid pusher plate 18 is slidably mounted and suspended upon the side frame legs 19 to include pusher plate openings 18a, with an opening 18a receiving a respective frame leg 19 therethrough. The rear frame leg 20 includes a rear frame leg support flange 21 mounted orthogonally, medially of, and extending below the rear frame leg 20. The support flange 21 slidably receives an actuator rod 22 slidably therethrough, with the actuator rod 22 including an actuator rod handle 23 mounted at a rear terminal end thereof. A forward terminal end of the actuator rod 22 includes a forward threaded end 24 threadedly and removably mounted relative to the pusher plate 18 orthogonally oriented thereto.

In this manner, the actuator rod 22 is readily directed through the rear web 17, the support flange 21, and threadedly mounted to the pusher plate 18 to effect enhanced ease of displacement of grass accumulated within the flexible bag 15 upon removal of the bag from the lawnmower 11 to expedite its discharge from the bag 15.

The modified lawnmower bag apparatus 10a, as illustrated in FIGS. 3-9, illustrates the use of actuator rod 22 formed as a modified tubular actuator rod 25, including the actuator rod handle 26 at a rear terminal end thereof. A modified pusher plate 27 is provided to include a slide frame 28 slidably mounted upon and suspended by the parallel side frame legs 19 through the openings 18a. A pivot frame plate 29 is pivotally mounted to a lower edge of the slide frame 28 and is coextensive therewith, and includes a spring hinge 30 to normally bias the pivot frame plate 29 at an oblique orientation relative to the slide frame 28 with the pivot frame plate 29 oriented forwardly towards the handle loop 14. A cable 31 includes its forward terminal end mounted to a pivot plate cable flange 32 fixedly mounted to a forward face of the pivot frame plate 29. A rear terminal end of the cable 31 is mounted to a cable actuator handle 33 slidably mounted within the actuator rod handle 26 within guide tracks 34, wherein the cable acutator handle 33 includes guide pins 35, with a guide pin 35 extending into a respective guide track 34 to maintain alignment of the cable actuator handle 33. In this manner, the pivot frame plate 29 by action of the spring hinge 30 defines a relatively rigid configuration to permit extension of the pivot frame plate and slide frame 29 and 28 respectively in an emptying procedure. Alternatively, the spring hinge 30 may be operative to permit the slide frame 28 to be directed forwardly, with grass accumulated within the bag 15 and upon pivotment of the pivot frame plate 29 to an oblique orientation relative to the slide frame 28, the accumulated grass may be compacted within the bag by projecting the pivot frame plate 29 over such accumulated grass and effecting pulling of the pivot frame plate 29 rearwardly towards the rear web 17. Subsequently, the structure may be projected rearwardly and oriented rearwardly of the grass to permit its use in an emptying procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawnmower bag apparatus for securement to a lawnmower, wherein the lawnmower includes directing chute, and the apparatus comprising, a flexible bag, the flexible bag including a top frame mounted within the flexible bag, the top frame including a forward frame leg spaced from and parallel a rear frame leg, and spaced parallel side frame legs to define a continuous frame loop formed of a generally cylindrical rod material, and a rigid slide frame mounted between the side frame legs, the slide frame including slide frame apertures, each slide frame aperture of the slide frame apertures receiving a side frame leg of the side frame legs, and an actuator rod handle, the actuator rod handle orthogonally mounted medially of the slide frame, and the flexible bag including a rear web, and the rear frame leg including a support flange, and the actuator rod slidably received through the support flange and the rear web, and a rear terminal end of the actuator rod including an actuator rod handle oriented rearwardly and exteriorly of the rear web to permit reciprocatingly directing the actuator rod through the support flange, and the support flange fixedly mounted medially to a bottom surface of the rear frame leg.

2. An apparatus as set forth in claim 1 wherein the slide frame includes a pivot frame plate coextensively and hingedly mounted to a lower edge of the slide frame, and the pivot frame plate including a spring hinge to bias the pivot frame plate to a raised orientation relative to the slide frame to define an oblique angle therebetween, wherein the pivot frame plate and the slide frame are displaced to a lower orientation, wherein the slide frame and the pivot frame plate are in a coplanar orientation relative to one another.

3. An apparatus as set forth in claim 2 wherein the actuator rod handle includes a cable actuator handle slidably mounted within the actuator rod handle, and the cable actuator handle including a plurality of guide pins extending laterally of and exteriorly of the cable actuator handle, and the actuator rod handle including a plurality of guide tracks, the guide tracks arranged in a parallel confronting relationship relative to one another to receive a guide pin of the guide pins, and the actuator rod handle including an upper terminal end of a cable mounted thereto, and the cable extending through the actuator rod handle and mounted to a pusher plate cable flange fixedly mounted to a forward face of the pivot frame plate and the pivot plate cable flange fixedly receiving the forward terminal end of the cable thereto to permit pivotment of the pivot frame plate relative to the slide frame.

* * * * *